Jan. 17, 1950     F. J. ARMSTRONG     2,494,535
SPRING FILTER CONSTRUCTION
Filed March 16, 1944     3 Sheets-Sheet 1
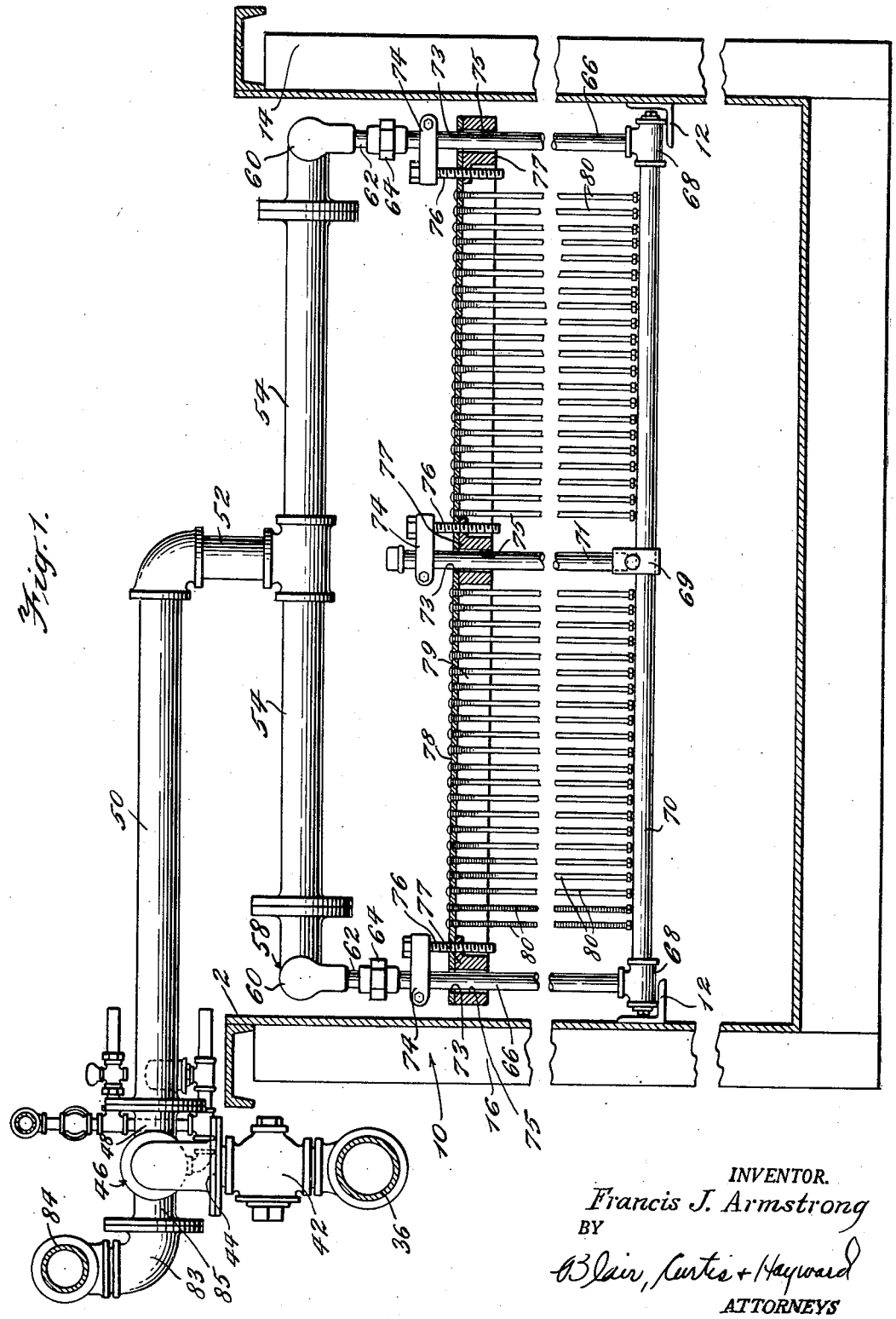
INVENTOR.
*Francis J. Armstrong*
BY
*Blair, Curtis + Hayward*
ATTORNEYS Jan. 17, 1950
F. J. ARMSTRONG
2,494,535
SPRING FILTER CONSTRUCTION
Filed March 16, 1944
3 Sheets-Sheet 2
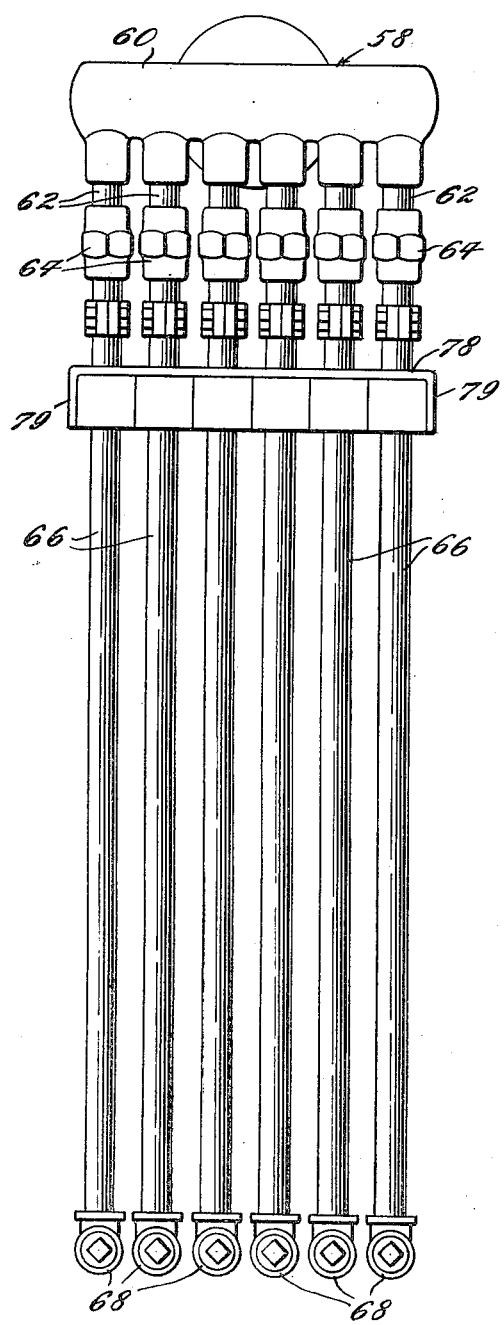
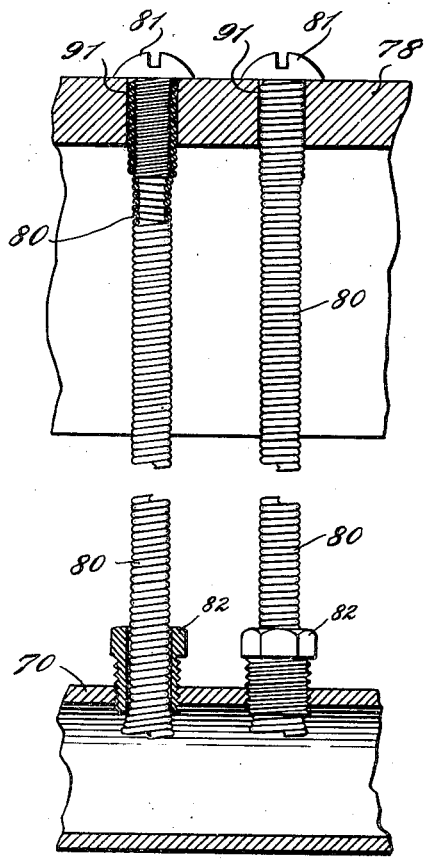
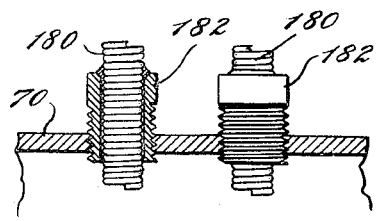
INVENTOR.
Francis J. Armstrong
BY
Blair, Curtis & Hayward
ATTORNEYS Jan. 17, 1950        F. J. ARMSTRONG        2,494,535
SPRING FILTER CONSTRUCTION Filed March 16, 1944        3 Sheets-Sheet 3

INVENTOR.
Francis J. Armstrong
BY
Blair, Curtis & Hayward
ATTORNEYS

Patented Jan. 17, 1950

2,494,535

UNITED STATES PATENT OFFICE 2,494,535

SPRING FILTER CONSTRUCTION

Francis J. Armstrong, Syracuse, N. Y., assignor to United States Hoffman Machinery Corporation, New York, N. Y., a corporation of Delaware Application March 16, 1944, Serial No. 526,736

20 Claims. (Cl. 210—184)

1

This invention relates to separation of materials from fluids, and more particularly to filtering liquid coolant for cutting and grinding tools and thus removing solid materials therefrom.

An object of this invention is to provide for the separation from a fluid of materials suspended in or mixed with the fluid. A further object is to provide a method and apparatus for automatically removing suspended particles or substances from a liquid whereby predetermined standards of separation are maintained. A still further object is to provide apparatus which will pass a liquid such as the coolant used in cutting and grinding tools, and which will remove from the liquid all solid matter which is larger than a predetermined size. A further object is to provide apparatus of the above character which operates without the use of a filter aid or other expendable materials.

A still further object is to provide apparatus of the above character from which accumulated materials may be readily dislodged in a minimum of time and with a minimum of effort. A still further object is to provide apparatus which is easy and inexpensive to manufacture and is light in weight, compact and sturdy in construction, and dependable and efficient in use. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings:

Figure 1 is a view partly in section of a filter unit which represents one embodiment of the invention;

Figure 2 is an enlarged side view of the filter unit of Figure 1;

Figure 3 is an enlarged sectional detail view of the manner of attaching the filter springs of the filter unit;

Figure 4 is a view similar to the lower portion of Figure 3 showing another manner of attaching the lower ends of the springs;

Figure 5:
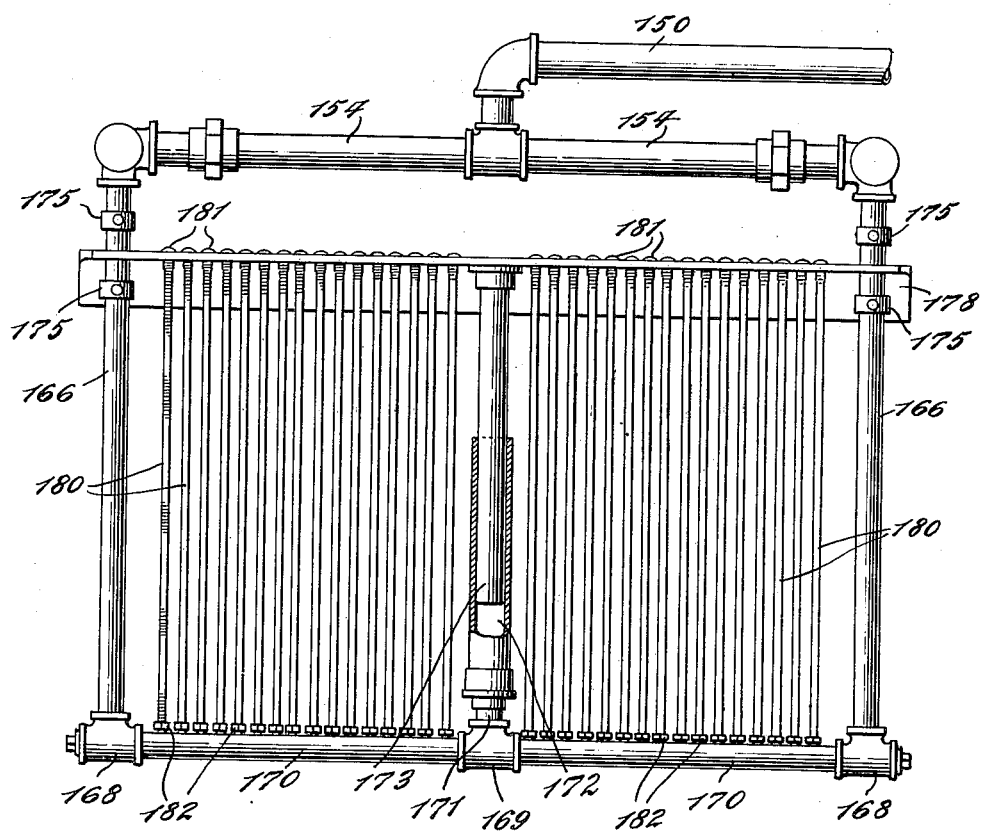
Figure 5 is an elevation of another embodiment of the invention.

Referring particularly to Figure 1 of the drawings, a filter unit 10 is shown positioned in an open-top tank 2 having side walls 14 and 16, with the filter unit resting upon angle bars 12 welded to the side walls. The filter unit is provided at the top with a horizontal pipe 50 and a vertical pipe 52 which is connected through a T-connection to two horizontal pipes 54. At the end of pipes 54 is a transverse header 58 (see also Figure 2) having a horizontal portion 60 and six downwardly extending connecting nipples 62. Each nipple 62 (see Figure 1) cooperates with the corresponding nipple of the other header to provide the connections to one of the six individual filter assemblies. Each of these filter assemblies is formed by a row of vertical springs 80 and a U-shaped pipe assembly having a horizontal pipe 70 at the bottom connected at its two ends through couplings 68 to two vertical pipes 66, the upper ends of which are connected respectively through couplings 64 to nipples 62.

Clamped to the center of each pipe 70 by a clamp 69 is a vertical brace pipe 71 which is parallel to pipe 66. Near the top of each of pipes 66 and 71 is a horizontal channel plate 78 which, as shown in Figure 2, has downwardly extending side flanges 79. Pipes 66 and 71 extend through holes 73 in plate 78 and the plate is adjustably supported from the pipes by brackets 74, one of which is attached to each of the pipes. Each bracket is clamped to its pipe by a clamping bolt and in turn supports an adjusting stud 76 which is received in a vertical hole in the bracket. Each of studs 76 is threaded into a suitable hole in an adjusting block 77 welded to the under side of plate 78. Each of the adjusting blocks 77 has a vertical hole 75 in alignment with the corresponding hole 73 in plate 78, and (Figure 2) each group of the adjusting blocks fit together in side-by-side relationship so that they form a solid block assembly between flanges 79. The three groups of blocks 77, positioned respectively at the two ends and the center of the channel plate, strengthen the channel plate and provide rigid guide and bracing means for the pipes; thus, a rigid frame is formed by pipes 54 (Figure 1), headers 58, pipes 66 and 71, pipe 70, channel plate 78 and the associated connecting means.

As indicated above, there are six individual filter assemblies each of which includes a row of filter springs 80 each of which is connected at the bottom to its pipe 70, the springs being equally spaced along the pipe except at the center where space is provided for pipe 71. The bottom end of each spring is open to the interior of pipe 70 so that liquid flows from the spring into the pipe. All of the springs have their upper ends supported by channel plate 78 with the springs extending through holes 91 which are in rows with each hole directly above the respective hole in the pipe 70. The manner of attaching springs 80 is best shown in Figure 3, there being threaded into the upper end of each spring a stud 81, the thread of which has a pitch slightly greater than the natural pitch of the spring. In this way, the stud tends to expand the spring and the stud and the spring are thereby locked together. The head of the stud rests upon the upper surface of plate 78 so that a firm support is provided for the upper end of the spring, but yet the spring may be expanded lengthwise so that the upper end of the spring slides through the hole in plate 78, all as will be explained below; when this occurs the head of stud 81 lifts from the surface of plate 78.

As shown at the bottom of Figure 3, the lower end of each spring 80 extends through a nipple 82 and is flared outwardly beneath the nipple. Nipple 82 is threaded into a hole in pipe 70 with the lower end of the nipple providing a seat against which the flared end of the spring is held by tension on the spring. Springs 80 are closewound springs of uniform size and other characteristics and during use the tension on the springs is such that there is a small gap of predetermined thickness between each turn of the spring and the next adjacent turn; thus, the spring forms a helical slit or gap extending between stud 81 and nipple 82, the length of the gap being approximately equal to the length of the wire in the spring. During use, the liquid flows into the spring through this gap and thence downwardly and out the flared lower end of the spring into pipe 70. The uniform length of the springs permits ready assembly and easy replacement, the assembly being merely the sticking of the upper end of the spring through the hole in plate 78, the turning of stud 81 into the end of the spring, and the turning of nipple 82 into the threaded hole in pipe 70. When the filter unit is initially assembled, nipples 82 are turned into their holes a uniform amount; as indicated above, the springs are of equal length and have uniform characteristics so that the gaps are all equal and uniform. After assembly, the gaps in all of the springs are changed simultaneously by turning studs 76 and thus moving plate 78 vertically.

The embodiment of Figure 4 differs from the embodiment of Figure 3 in that each of the springs 180 is attached to its pipe 70 by soldering the spring to a nipple 182 threaded in the pipe. During assembly, the springs are suspended freely from their supporting studs 81 and the lower ends of the springs hang into nipples 182, and the springs are then soldered to the nipple. Thereafter the channel plate 78 is adjusted to obtain the desired filter gap in the springs in the same manner that the gap is adjusted in the embodiment of Figure 3.

Referring again to Figure 1, during use suction is maintained on pipe 70 so that the coolant flows through the gap in each spring into the center of the spring and thence downwardly to pipe 70. The diameter of the spring is relatively small but is large enough to permit the coolant to flow freely. The vertical position of the spring prevents bowing of the spring to the side as would occur if the spring were held in a horizontal position, and the wire from which the spring is made is of sufficient strength to hold the weight of the spring without appreciably extending the spring; thus, the gap is uniform throughout its length. The tension on the springs is such that the gaps prevent the passing of undesirable substances with the coolant and these substances form a deposit upon the outside of the spring.

In the present embodiment, this deposit is removed by reversing the flow of coolant through the spring; that is, clean coolant with air or other gas is pumped into pipes 70 and thence through springs 80 and out through the gaps. This clean coolant and air is under pressure and thus exerts pressure within the spring expanding the spring lengthwise; thus, the upper end of the spring slides upwardly through the hole 91 in plate 78 and the head of stud 81 is lifted from the upper surface of the plate. The air with the clean coolant enters the springs in the form of slugs and as these slugs of air move up the springs and out through the gaps, an agitated action results which causes the springs to vibrate; thus, the length of each spring tends to change constantly. The expanding of the spring increases the width of the gap and causes a slight twisting of the wire in the spring; these actions, combined with the action of the coolant and air which is being discharged through the gap dislodge the deposit and carry it out of the gap. With the spring in the vertical position, the deposit falls and settles to the bottom of tank 2. With some types of liquid the backwash operation is carried on with liquid alone but it has been found that with coolant the combined action of liquid and slugs of air removes the deposited substances effectively in a minimum of time.

The clean coolant and air is supplied to pipes 70 through pipes 66, headers 58, pipes 54, and pipes 52 and 50. Pipe 50 receives the clean coolant and air through the backwash valve 46 from coupling 83 and pipe 84 which in turn is connected to the pipe (not shown) supplying coolant to the machine tools. The details of construction of the backwash valve and the entire coolant supply system are shown in the copending application of the present applicant and Henry F. Hamlin, application Serial No. 529,735, filed March 16, 1944. Valve 46 has a downward opening 44 which is connected through a cut-off valve 42 and a pipe 36 to a suction line through which the clean coolant is withdrawn from the filter unit. Valve 46 has a valve member (not shown) which is moved between two positions, in one of which the valve member closes the opening between connection 48 and connection 85, and in the other of which it closes the opening between connection 48 and connection 44. Thus, valve 46 controls the withdrawing of clean coolant from the filter unit and the initiating of the backwash operation which consists of supplying clean coolant and air to the filter unit.

The backwash operation is carried on at such time and at such frequency as will best suit the demands of the particular installation. Under some conditions of operation as with the filtering of certain liquids, the deposit does not interfere materially with the flow of liquid through the gaps into the springs and a very thick deposit may be formed before the filter unit is backwashed; under other conditions, even a thin deposit must be removed in order to obtain results. For any particular conditions of operation all of the springs in a filter unit tend to become clogged at the same time. However, the premature clogging of one or several springs of a filter unit, or the clogging of a part of one spring, does not interfere with the operation of the remainder of the filter unit. During the backwash operation the pressure within each spring tends to expand the spring and the pressure is maintained as long as the gap is clogged; thus, so long as the backwash operation is continued each clogged spring tends to expand itself and vibrate so that all of the springs act individually to remove the deposit from themselves.

Figure 6:
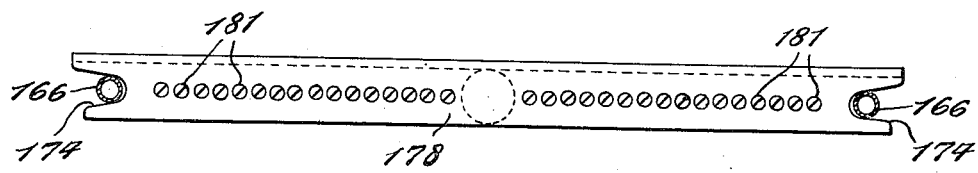
Figure 6 is a plan view of the embodiment of Figure 5.

In the embodiment of Figures 5 and 6 a single row of springs 180 is carried by a U-frame formed by two vertical pipes 166 and a pair of horizontal pipes 170, there being couplings 168 connecting each pipe 166 to its pipe 170 and a T-connection 169 connecting pipes 170 to a vertical riser 171. Riser 171 is connected to the lower end of a cylinder 172 in which is slidably positioned a piston 173 which is in the form of a pipe closed at its lower end and attached at its upper end to the center of an angle bar 178. As shown in Figure 6, the ends of angle bar 178 are notched at 174 and fit pipes 166. Bar 178 may slide vertically (Figure 5) on pipes 166 and the movement is limited by a pair of stops 175 on each of pipes 166. The ends of springs 180 are supported by studs 181 at the top and nipples 182 at the bottom. Clean coolant is withdrawn from the unit from the top of pipes 166 through a pair of pipes 154 and pipe 150.

When the backwash operation is to be carried on, the backwash liquid is pumped into the unit through pipe 150 with the result that pressure is built up in cylinder 172. This exerts an upward pressure on piston 173 and slides angle bar 178 upwardly to the position shown in Figure 5. With this embodiment liquid alone is used to perform the backwash operation and the action in each spring is similar to that described above except that the springs tend to expand uniformly. In addition to the individual expanding action in each spring, piston 173 acts to stretch all of the springs.

Under some circumstances, the backwash operation in the above embodiments is carried on by use of air alone. However, due to the fact that the units are immersed in the liquid there is a combined liquid-air action upon each spring which is effective to dislodge the deposit.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. In a spring filter unit for fluid of the type which is immersed in a body of fluid to be filtered, the combination of: a frame structure constituting a support and a fluid connection to the unit comprising, a plurality of parallel U-shaped pipe assemblies each of which has a fluid passageway therethrough and which is formed by a horizontal pipe and two vertical pipes at the opposite ends thereof, a pair of headers connected respectively to the opposite ends of the pipe assemblies, said headers and said pipe assemblies having passageways therethrough which are interconnected for the flow of fluid, an adjusting plate positioned horizontally above the horizontal pipes of said pipe assemblies, and means adjustably supporting said adjusting plate from said vertical pipes; and a plurality of vertical filter coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being positioned in rows with the springs of each row connected at their lower ends to one of said horizontal pipes and attached at their upper ends to said plate, the central portion of each spring being open at the lower end of the spring to the passageway in the horizontal pipe to which the spring is connected thereby to provide fluid passageways from each of the filter gaps through the spring and thence through the pipe assemblies to the headers.

2. In a spring filter unit for fluid of the type which is immersed in a body of fluid to be filtered, the combination of: a frame structure constituting a support and a fluid connection to the unit comprising, a plurality of parallel U-shaped pipe assemblies each of which has a fluid passageway therethrough and which is formed by a horizontal pipe and two vertical pipes at the opposite ends thereof, a pair of headers connected respectively to the opposite ends of the pipe assemblies, said headers and said pipe assemblies having passageways therethrough which are interconnected for the flow of fluid, means forming a fluid connection to said headers, an adjusting plate positioned horizontally above the horizontal pipes of said pipe assemblies, and means adjustably supporting said adjusting plate from said vertical pipes; a plurality of vertical filter coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being positioned in rows with the springs in each row being associated with one of said horizontal pipes and open at their lower ends to the pipe; a plurality of nipples mounted on the horizontal pipes at the ends of the springs each nipple having a central opening through which the central portion of the spring is open to the passageway in its horizontal pipe and each nipple having an annular portion which provides a substantially fluid-tight connection with its spring thereby providing the attaching means between said springs and said horizontal pipes; and a plurality of studs attaching the upper ends of said springs to said plate.

3. In a spring filter unit for fluid of the type which is immersed in a body of fluid to be filtered, the combination of: a frame structure constituting a support and a fluid connection to the unit comprising, a plurality of parallel U-shaped pipe assemblies each of which has a fluid passageway therethrough and which is formed by a horizontal pipe and two vertical pipes at the opposite ends thereof, a pair of headers connected respectively to the opposite ends of the pipe assemblies, said headers and said pipe assemblies having passageways therethrough which are interconnected for the flow of fluid, an adjusting plate positioned horizontally above the horizontal pipes of said pipe assemblies, and a plurality of brackets adjustably supporting said adjusting plate from said vertical pipes; a plurality of vertical coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being positioned in rows with the springs of each row associated at their lower ends with one of said horizontal pipes and at their upper ends with said plate, said springs being open at their lower ends to their respective pipes; a plurality of nipples surrounding respectively the lower ends of said springs and threaded into holes in the pipes to provide the connection between the springs and the pipes; said plate having holes through which the upper ends of said springs extend, and a plurality of individual means closing the upper ends of said springs and holding the ends extended through the holes.

4. A spring filter unit which is adapted to be immersed in a body of fluid to be filtered comprising, a frame formed by an open-ended horizontal pipe and a plurality of vertical supporting members, a horizontal member parallel to said horizontal pipe and adjustably attached to the top ends of said supporting members, a plurality of vertical coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being each secured at its lower end to said pipe with the end of the spring open to the interior of the pipe and each being loosely received at its upper end in an opening in said horizontal member, and means supporting the upper end of each of said springs comprising a screw threaded into and plugging the end of the spring with the axis of the screw extending along the longitudinal axis of the spring and said screw having ledge means overhanging the side of the opening through said horizontal member, whereby said springs may be backwashed by pumping clean fluid into the springs and the upper end of each spring is free to rise due to a lengthening of the spring caused by the fluid pressure within the spring.

5. Apparatus as described in claim 4 wherein the connection between each vertical supporting member and said horizontal member comprises, a block rigidly attached to said horizontal member and having two openings, one of which is threaded and through the other of which the vertical supporting member extends, a bracket attached to said supporting member above said block, and a stud carried by said bracket and threaded into the threaded opening in said block.

6. Apparatus as described in claim 4 wherein the lower end of each spring is enlarged and the attachment between the spring and the pipe is provided by a sleeve threaded into the pipe with the end of the spring held in the sleeve by the enlarged end of the spring.

7. Apparatus as described in claim 4 wherein the attachment between each spring and the pipe is provided by a sleeve surrounding the spring and threaded into the pipe with the sleeve soldered to the spring.

8. A filter unit comprising, a plurality of spaced parallel pipes, a connecting pipe positioned transversely of said parallel pipes and rigidly connected to said parallel pipes to form a frame construction with passageways through said pipes which are open to each other, a supporting member parallel to said connecting pipe and slidably mounted on said parallel pipes at the ends thereof opposite said connecting pipe, and a plurality of filter coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being positioned parallel to each other and extending between said connecting pipe and said supporting member with each spring being attached by a substantially fluid-tight annular connection to said connecting pipe and with the central passageway in the spring being open at its respective end to the passageway in said connecting pipe and being closed at its opposite end.

9. In a filter unit, the combination of, a pair of parallel pipes, a connecting pipe connecting one end of one of said parallel pipes to one end of the other of said parallel pipes thereby to form a U-shaped frame with passageways through said pipes which are open to each other, a supporting means slidably mounted on said parallel pipes parallel to said connecting pipe and spaced therefrom, a plurality of coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being parallel to said parallel pipes and positioned in spaced relationship therebetween with one end of each spring connected to said connecting pipe and with the other end connected to said supporting means, each spring having the passageway through it connected to the passageway in said connecting pipe, and means to move said supporting member to and from said connecting pipe whereby the tension on said springs is changed.

10. Apparatus as described in claim 9 wherein said supporting member is in the form of a plate having holes therethrough through which the respective ends of the springs extend, and wherein each spring has at the end which extends through said plate means closing the end of the spring and providing a ledge which rests against the plate surface to hold the spring in said hole.

11. Apparatus as described in claim 9 wherein said supporting member is an angle bar which is notched at its ends to receive said parallel pipes, and wherein a piston-cylinder unit is positioned between said parallel pipes and parallel thereto with the cylinder connected to said connecting pipe and with the piston connected to said supporting means.

12. In a filter unit, the combination of, a pair of parallel pipes, a connecting pipe connecting one end of one of said parallel pipes to one end of the other of said parallel pipes thereby to form a U-shaped frame with passageways through said pipes which are open to each other, a supporting means slidably mounted on said parallel pipes parallel to said connecting pipe and spaced therefrom, a plurality of coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being parallel to said parallel pipes and positioned in spaced relationship therebetween with one end of each spring connected to said connecting pipe and with the other end connected to said supporting means, a piston-cylinder unit positioned parallel to said parallel pipes and connected between said connecting pipe and said supporting member, and means to direct fluid under pressure into the cylinder to move said supporting member away from said connecting pipe and thereby to extend the springs.

13. In a filter unit, the combination of, a horizontal pipe having a plurality of spaced holes along the top side thereof, a plurality of nipples threaded into said holes, a plurality of vertical coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs extending at their lower ends into said nipples and having their lower ends expanded whereby the springs are held with their lower ends in said horizontal pipe, an adjusting plate positioned above said horizontal pipe and parallel thereto with a plurality of holes corresponding respectively to the holes in said pipe, the upper ends of said springs extending through the holes in said plate, means associated with the upper end of each of said springs to close the end of the spring and provide an overhanging portion which engages the upper surface of said plate whereby the springs are held between said plate and said pipe, and means providing a mounting for said pipe and said plate.

14. In a filter unit, the combination of, a plurality of parallel coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, means mounting said springs in predetermined relationship comprising two structures, one of which provides a fluid connection to one end of each of the springs and the other of which provides a ledge support for the opposite ends of the springs, and means mounting said structures in adjustable predetermined relationship with the springs tensioned to provide a filter gap between adjacent turns in the springs and with the ledge support providing for the free extension of the springs so that the springs may be backwashed by causing a reverse flow of fluid through the springs at which time the springs are expanded longitudinally due to the pressure within the springs.

15. In a filter unit, the combination of, a header assembly having a plurality of openings in predetermined spaced relationship, a plurality of coil springs the individual turns of which are held in predetermined spaced relationship to provide filter gaps each of which is open at one side to the space surrounding the spring and at the other side to the center of its spring whereby the fluid being filtered may pass through the filter gaps and the residue is collected in the filter gaps, said springs corresponding in number to said openings and with said springs being positioned with one end of each spring respectively at one of said openings to provide a fluid connection from said header assembly through said openings respectively through the ends of the springs to the interior of each spring, means connecting said springs to said header assembly, and means providing a one-way support for the end of each spring opposite said header assembly whereby the springs are held under tension to provide gaps between adjacent turns of the springs through which fluid passes into the interior of the springs and thence to said header assembly and whereby the end of the spring is free to leave said support so that a reversal of the flow of fluid causes an expansion of the springs longitudinally.

16. In a filter unit, the combination of, means constituting a header assembly having a plurality of nipples with vertical openings therein, a plurality of vertical coil springs the individual turns of which are held in predetermined spaced relationship to provide filter gaps each of which is open at one side to the space surrounding the springs and at the other side to the center of its spring whereby the fluid being filtered may pass through the filter gaps and the residue is collected in the filter gaps, said springs being corresponding in number to the number of said nipples with one spring having one end positioned in each of said nipples and held therein to provide a fluid connection from the header assembly through the nipple to the interior of the spring, and support means for the opposite ends of the springs in the form of ledge means which holds the springs under tension and which permits the springs to expand longitudinally during the backwashing of the springs.

17. In a filter unit, the combination of, a substantially horizontal pipe having a plurality of vertical openings in horizontal alignment, support means providing horizontally disposed ledge means vertically spaced from and parallel to said openings, a pair of vertical pipes positioned respectively at the opposite ends of said horizontal pipe and providing fluid connections from the ends of said horizontal pipe, an intermediate vertical support member extending between said support means and said horizontal pipe, a plurality of coil-spring filter elements each including an elongated coil spring the individual turns of which are held in predetermined spaced relationship to provide a filter gap which is open at one side to the space surrounding the spring and at the other side to the center of the spring whereby the fluid being filtered may pass through the filter gap and the residue is collected in the filter gap and with the elements corresponding in number to the number of said openings, there being the end of one coil spring positioned respectively within each of said openings, means connecting said horizontal pipe to the adjacent end of each of said coil springs, and a plurality of screws at the ends of said coil springs opposite said horizontal pipe with the screws threaded longitudinally into the ends of the coil springs and having heads overlying the ends of the coil springs and said ledge means.

18. In the art of filtering fluid by the use of spring filters, the steps of, drawing the filtered fluid from the inside of a coil spring which is immersed in the fluid thereby to form a deposit about the outside of the spring, and reversing the flow of fluid by supplying fluid at relatively high pressure to the inside of the spring whereby the spring is caused to expand and the deposit is released.

19. In the art of filtering a fluid by the use of a coil spring which is securely held at one end and the other end of which may move longitudinally of the spring axis so as to elongate the spring, the steps of, drawing the filtered fluid from the inside of the spring whereby the space between the turns of the spring acts as a filter gap and the residue is deposited along the outside of the filter gap, and reversing the flow of fluid by supplying fluid at a relatively high pressure to the inside of the spring whereby the spring is elongated and the fluid flows in a reverse direction through the filter gap.

20. In a filter unit, the combination of, a header assembly having a plurality of openings therein, a plurality of filter coil springs the individual turns of which are held in predetermined spaced relationship to provide filter gaps each of which is open at one side to the space surrounding the spring and at the other side to the passageway through the center of the spring whereby the fluid being filtered passes through the filter gaps and the residue is collected in the filtered gaps, said springs corresponding in number to the openings in said header assembly and having their ends positioned respectively in said openings, a plurality of rigid cylindrical sleeves threaded respectively in each of said openings and surrounding the respective springs, each of said springs being anchored to its sleeve and thereby supported by the header assembly, and means supporting the other end of each of said springs.

FRANCIS J. ARMSTRONG.

REFERENCES CITED

The following references are of record in the file of this patent:

UNITED STATES PATENTS

| Number | Name | Date |
|---|---|---|
| 408,487 | Jewell | Aug. 6, 1889 |
| 602,488 | Tice et al. | Apr. 19, 1898 |
| 1,078,812 | Van Fossen | Nov. 18, 1913 |
| 1,279,611 | Timmins | Sept. 24, 1918 |
| 2,068,282 | Strindberg | Jan. 19, 1937 |
| 2,081,198 | Hahn | May 25, 1937 |
| 2,197,971 | Elze et al. | Apr. 23, 1940 |
| 2,301,430 | Malanowski | Nov. 10, 1942 |
| 2,342,669 | Hoffman | Feb. 29, 1944 |
| 2,399,887 | Olsen | May 7, 1946 |

FOREIGN PATENTS

| Number | Country | Date |
|---|---|---|
| 636,693 | France | Jan. 14, 1928 |
| 467,511 | Germany | Oct. 25, 1928 |
| 39,483 | France | Aug. 11, 1931 |
| | (Addition to No. 693,614) | |